(12) United States Patent
Rajashekara et al.

(10) Patent No.: US 8,786,262 B2
(45) Date of Patent: Jul. 22, 2014

(54) SYSTEMS AND METHODS FOR SYNCHRONOUS POWER GENERATION

(75) Inventors: Kaushik Rajashekara, Carmel, IN (US); John Timothy Alt, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 447 days.

(21) Appl. No.: 13/190,076

(22) Filed: Jul. 25, 2011

(65) Prior Publication Data

US 2013/0027002 A1  Jan. 31, 2013

(51) Int. Cl.
H02H 7/06 (2006.01)

(52) U.S. Cl.
USPC .................................. 322/25; 322/29

(58) Field of Classification Search
USPC ............................... 322/22, 23, 24, 25, 29, 37
See application file for complete search history.

(56) References Cited

U.S. PATENT DOCUMENTS

| | | | |
|---|---|---|---|
| 5,083,039 A * | 1/1992 | Richardson et al. | 290/44 |
| 5,581,168 A | 12/1996 | Rozman et al. | |
| 5,652,485 A * | 7/1997 | Spiegel et al. | 318/147 |
| 6,420,795 B1 * | 7/2002 | Mikhail et al. | 290/44 |
| 6,737,833 B2 * | 5/2004 | Kalman et al. | 322/20 |
| 6,850,426 B2 | 2/2005 | Kojori et al. | |
| 6,950,322 B2 | 9/2005 | Ferens | |
| 7,050,313 B2 | 5/2006 | Huang et al. | |
| 7,112,944 B1 | 9/2006 | Kojori | |
| 7,298,102 B2 | 11/2007 | Sopko et al. | |
| 7,307,403 B2 | 12/2007 | Sarlioglu et al. | |
| 7,466,106 B2 | 12/2008 | Sarlioglu et al. | |
| 7,508,086 B2 | 3/2009 | Huang et al. | |
| 7,593,243 B2 | 9/2009 | Ganev et al. | |
| 8,198,742 B2 * | 6/2012 | Jorgensen et al. | 290/44 |
| 8,395,360 B2 * | 3/2013 | Tripathi et al. | 322/29 |
| 2008/0140226 A1 | 6/2008 | Ganev | |
| 2008/0234838 A1 | 9/2008 | Ghanekar et al. | |
| 2009/0174188 A1 | 7/2009 | Huang et al. | |
| 2009/0295314 A1 | 12/2009 | Ganev et al. | |
| 2010/0090641 A1 | 4/2010 | Oyake et al. | |

FOREIGN PATENT DOCUMENTS

| | | |
|---|---|---|
| EP | 2299586 | 3/2011 |
| WO | 9907996 | 2/1999 |

OTHER PUBLICATIONS

United Kingdom Intellectual Property Office. Search Report under Section 17. Application No. GB1212939.1. Nov. 21, 2012.

* cited by examiner

Primary Examiner — Nicholas Ponomarenko
(74) Attorney, Agent, or Firm — Krieg DeVault LLP

(57) ABSTRACT

One embodiment of the present invention is a unique method of controlling the output of a synchronous electrical machine. Another embodiment is a unique method of controlling the output of a synchronous electrical machine for powering a load. Still another embodiment is a unique aircraft power generation system. Other embodiments include apparatuses, systems, devices, hardware, methods, and combinations for fluid driven actuation systems. Further embodiments, forms, features, aspects, benefits, and advantages of the present application will become apparent from the description and figures provided herewith.

24 Claims, 2 Drawing Sheets

SYSTEMS AND METHODS FOR SYNCHRONOUS POWER GENERATION

FIELD OF THE INVENTION

The present invention relates to power generation, and more particularly, to synchronous power generation.

BACKGROUND

Synchronous power generation systems that effectively operate under varying speed and load conditions, remain an area of interest. Some existing systems have various shortcomings, drawbacks, and disadvantages relative to certain applications. Accordingly, there remains a need for further contributions in this area of technology.

SUMMARY

One embodiment of the present invention is a unique method of controlling the output of a synchronous electrical machine. Another embodiment is a unique method of controlling the output of a synchronous electrical machine for powering a load. Still another embodiment is a unique aircraft power generation system. Other embodiments include apparatuses, systems, devices, hardware, methods, and combinations for synchronous power generation systems and the control thereof. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
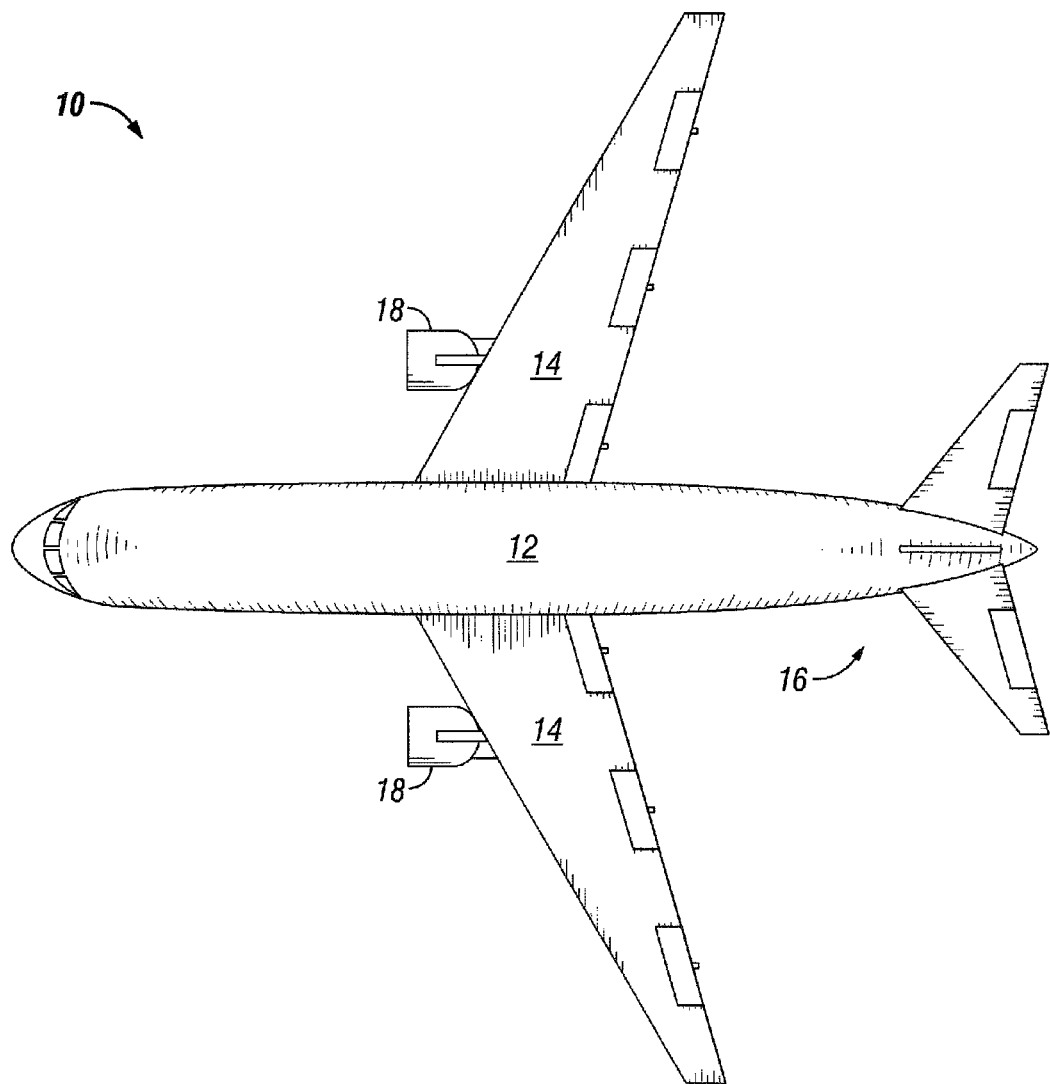
FIG. 1 illustrates some aspects of a non-limiting example of an aircraft in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of a system 10 in accordance with an embodiment of the present invention. In one form, system 10 is an aircraft, referred to herein as aircraft 10. In other embodiments, system 10 may be any type of engine powered system or vehicle, including one or more types of air-vehicles; land vehicles, including and without limitation, tracked and/or wheeled vehicles; marine vehicles, including and without limitation, surface vessels, submarines and/or semi-submersibles; amphibious vehicles, or any combination of one or more types of air, marine and land vehicles. In various forms, system 10 may be manned and/or autonomous.

In one form, aircraft 10 includes a fuselage 12, wings 14, an empennage 16 and one or more propulsion systems 18. In one form, aircraft 10 is a twin engine turbofan aircraft. In other embodiments, aircraft 10 may be any fixed-wing aircraft, including turbofan aircraft and turboprop aircraft, or may be any rotary wing or hybrid rotary wing and fixed wing aircraft. In various embodiments, aircraft 10 may have a single engine or a plurality of engines. In various embodiments, aircraft 10 may employ any number of wings 14. Empennage 16 may employ a single or multiple flight control surfaces.

Figure 2:
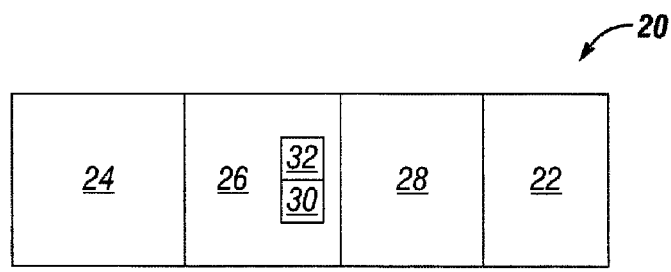
FIG. 2 schematically illustrates some aspects of a non-limiting example of a power generation system in accordance with an embodiment of the present invention.

Referring now to FIG. 2, some aspects of a non-limiting example of a power generation system 20 in accordance with an embodiment of the present invention is schematically depicted. In one form, aircraft 10 employs power generation system 20 for supplying electrical power to a load 22. In one form, load 22 is a dc load. In other embodiments, load 22 may be any electrical load. Power generation system 20 includes an engine 24, a synchronous generator 26 and a power conversion system 28. In one form, engine 24 is a propulsion engine for aircraft 10, and is considered a part of propulsion system 18. In other embodiments, engine 24 may be any engine associated with aircraft 10, e.g., a propulsion engine or an auxiliary power unit (APU). In still other embodiments, engine 24 may be any engine associated with any system. In one form, engine 24 is a gas turbine engine. In a particular form, engine 24 is a turbofan engine. In other embodiments, engine 24 may be any type of gas turbine engine, or may be a hybrid engine, a piston engine or any other type of engine.

Synchronous generator 26 is coupled to and powered by engine 24. In one form, synchronous generator 26 is coupled to engine 24 via a direct drive, e.g., whereby engine 24 and synchronous generator 26 have the same rotational speed. In other embodiments, synchronous generator 26 may be coupled to engine 24 via one or more transmissions, or may be mounted on a shaft or spool of engine 24. Synchronous generator 26 includes a field winding 30 and a armature (stator) winding 32. In one form, synchronous generator 26 is a three phase synchronous generator having output phase legs 32A, 32B and 32C. In other embodiments, synchronous generator 26 may output any number of phases, and may be, for example, a 5-phase machine. Power conversion system 28 is coupled to synchronous generator 26 and to load 22. Power conversion system 28 is configured to control the output of synchronous generator 26 and supply electrical power from synchronous generator 26 to dc bus 34 for powering load 22. In some embodiments, power generation system 20 may include or be coupled to an energy storage system 36 in parallel with load 22, e.g., a battery and/or one or more other types of energy storage systems coupled to dc bus 36. In other embodiments, power generation system 20 may not include an energy storage system such as energy storage system 36.

Figure 3:
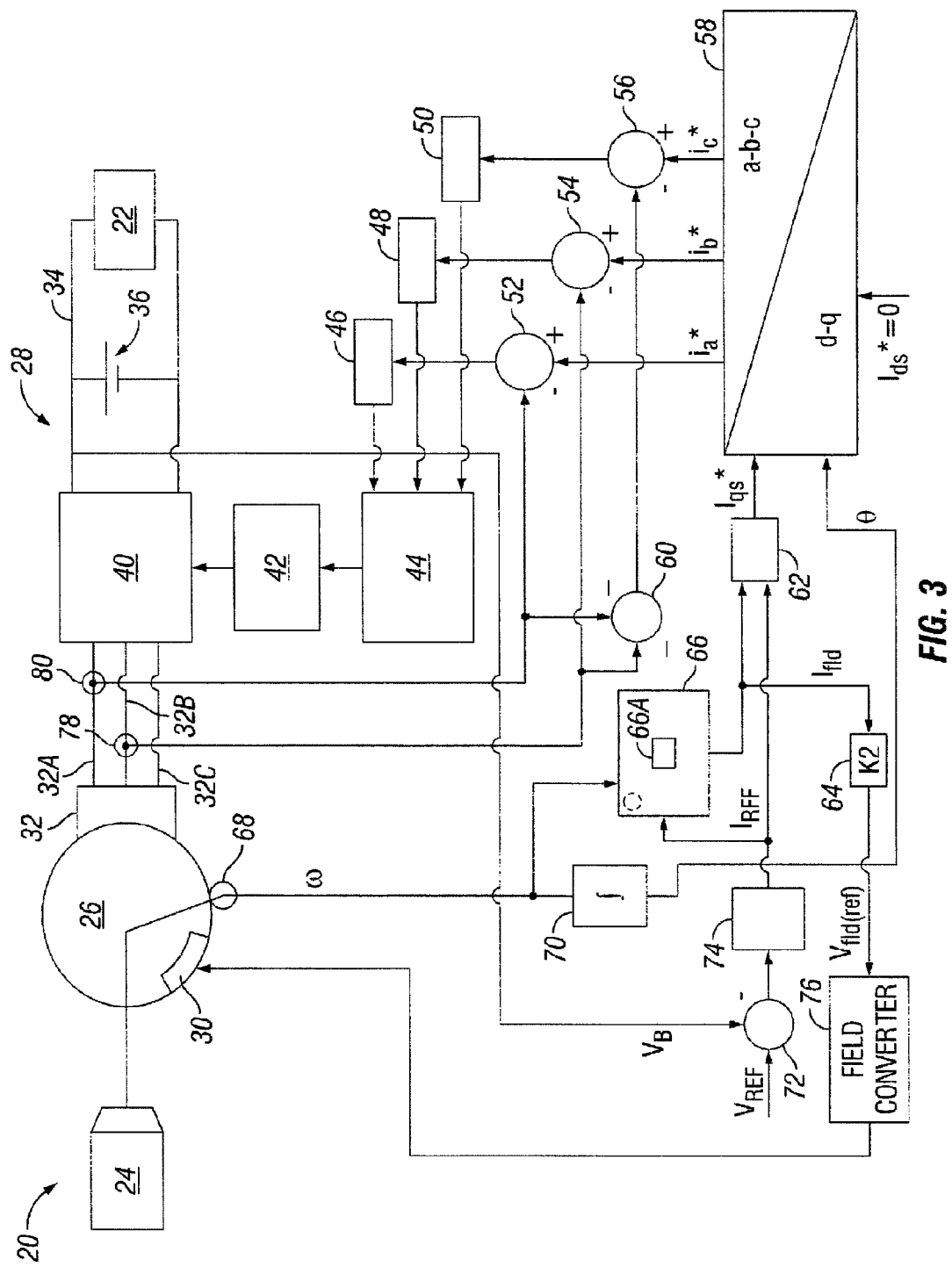
FIG. 3 schematically illustrates some aspects of non-limiting example of a power generation system with a power conversion system in accordance with an embodiment of the present invention.

Referring to FIG. 3 some aspects of a non-limiting example of power generation system 20 in accordance with an embodiment of the present invention are schematically depicted. Power conversion system 28 includes a plurality of electronic elements or devices, each of which may be formed as a discrete element or formed from as one or more sub-elements.

In various embodiments, the elements of power conversion system 28 may be formed on a single chip, e.g., an application specific integrated circuit (ASIC) or as a plurality of chips and/or other discrete components. In one form, power conversion system 28 includes electronic elements (devices) in the form of a power converter 40; a gate drive 42; a pulse width modulation (PWM) signal driver 44; controller blocks 46, 48 and 50; error blocks 52, 54 and 56, a direct quadrature (d-q) to a-b-c reference frame transform block 58; a summer block 60; transfer functions 62 and 64; a flux value output unit 66; a speed sensor 68; an integrator block 70; an error block 72; a controller block 74; a field converter 76 and phase leg current sensors 78 and 80.

Power converter 40 is communicatively coupled to phase legs 32A, 32B and 32C of synchronous generator 26. Power converter 40 is communicatively coupled to energy storage system 36 and load 22 via dc bus 34. Gate drive 42 is communicatively coupled to with power converter 40 and with PWM signal driver 44. Controller blocks 46, 48 and 50 are communicatively coupled to error blocks 52, 54 and 56, respectively. In one form, controller blocks 46, 48 and 50 are proportional-integral (PI) controllers. In other embodiments, other controller types may be employed in addition to or in place of PI controller blocks.

PWM signal driver 44 is configured to generate PWM logic level control signals based on the output of transform block 58 and the phase current output of synchronous generator 26. Gate drive 42 is communicatively coupled to PWM signal driver 44 and with power converter 40. Gate drive 42 is configured to receive the PWM logic signals from PWM signal driver 44 and to output driver signals to power converter 40 for controlling the operation of power converter 40. Power converter 40 includes a plurality of power semiconductor switching devices (not shown), for example and without limitation, insulated gate bipolar transistors (IGBTs), that perform power switching to convert the output of synchronous generator 26 to direct current for use on dc bus 34. In other embodiments, other switching devices may be employed, e.g., metal-oxide semiconductor field effect transistors (MOSFETs).

Transform block 58 includes a torque component current ($I_{qs}*$) value input; an angular position e value input; a flux component current ($I_{ds}*$) value input; and reference phase current $i_a*$, $i_b*$ and $i_c*$ value outputs. Transform block 58 is configured to transform direct-quadrature reference frame data into 3-phase a-b-c reference frame data. In other embodiments, other transforms may be employed. Error blocks 52, 54 and 56 are communicatively coupled to $i_a*$, $i_b*$ and $i_c*$ outputs, respectively, of transform block 58. Error blocks 52 and 54 are also communicatively coupled to phase current sensors 80 and 78, respectively. Phase current sensors 80 and 78 are configured to sense the current in phase legs 32A and 32B, respectively, convert the current values into voltage values, and to output the voltage values as values indicative of phase leg 32A current and phase leg 32B current, respectively. The inputs of summer block 60 are communicatively coupled to phase current sensors 80 and 78, and the output of summer block 60 is communicatively coupled to error block 56. Summer block 60 is configured to determine, e.g., calculate, a current value indicative of phase leg 32C current, based on the output of phase current sensors 80 and 78, e.g., based on the equation, $i_a+i_b+i_c=0$. Summer block 60 is configured to pass the current value indicative of phase leg 32C current to error block 56.

Speed sensor 68 is configured to sense the rotational velocity (frequency) ω of synchronous generator 26. In one form, speed sensor 68 is mounted on synchronous generator 26. In other embodiments, speed sensor 68 may be mounted in other locations or its function may be derived using the sensed currents from phase current sensors 78 and 80. In still other embodiments, speed sensor 68 may be configured to sense the rotational speed of the output shaft of engine 24 that is coupled to synchronous generator 26. Integrator block 70 is communicatively coupled to speed sensor 68. Integrator block 70 is configured to integrate the output of speed sensor 68 (operating frequency ω of synchronous generator 26) to generate angular positional data θ indicative of the angular (rotational) position of synchronous generator 26. Integrator block 70 is communicatively coupled to the θ input of transform block 58, and is configured to pass the positional data θ to transform block 58.

Error block 72 is configured to determine the difference between the desired dc bus 34 voltage ($V_{REF}$) and the actual dc bus 34 voltage ($V_B$) (e.g., $V_B$ as measured by a voltage sensor, not shown). Controller block 74 is communicatively coupled to error block 72. In one form, controller block 74 is a proportional-integral (PI) controller. In other embodiments, other control types may be employed in addition to or in place of a PI controller. Controller block 74 is configured to integrate and amplify the difference error obtained via the comparison of desired voltage $V_{REF}$ and the actual voltage $V_B$ to obtain a reference current $I_{REF}$ in the form of a numerical value.

Controller block 74 is communicatively coupled to flux value output unit 66. Controller block 74 is configured to pass $I_{REF}$ to both flux value output unit 66 and transfer function 62. Flux value output unit 66 is also communicatively coupled to speed sensor 68 and to transfer function 62. Flux value output unit 66 is configured to receive the operating frequency ω (rotational speed) of synchronous generator 26 from speed sensor 68, and to receive and $I_{REF}$ from controller block 74. Flux value output unit 66 is configured to output data, e.g., a flux value, based on the current $I_{REF}$ and the current operating frequency ω. In one form, the output of flux value output unit 66 is a field component current $I_{fld}$ numerical value. In one form, the output of flux value output unit 66 varies with $I_{REF}$ and operating frequency ω. Since $I_{REF}$ is based on the difference error obtained via the comparison of desired voltage $V_{REF}$ and the actual voltage $V_B$, the output of flux value output unit 66 varies with the difference error. In one form, flux value output unit 66 includes a lookup table (LUT) 66A, e.g., stored in a memory, in software, firmware and/or hardware (not shown). In one form, LUT 66A stores data, e.g., data in the form of a plurality of flux levels for controlling the operation of synchronous generator 26 under a plurality of different synchronous generator 26 speed and load conditions anticipated in field-service and/or testing of synchronous generator 26 and/or other components of power generation system 20. In other embodiments, other forms of data may be employed, e.g., continuous and/or discontinuous equations that provide a flux level output that varies based on speed and load conditions. Flux value output unit 66 is configured to pass the field component current $I_{fld}$ value to transfer function 62 and to transfer function 64.

Transfer function 62 is configured to combine $I_{fld}$ and $I_{REF}$, and output a torque component current $I_{qs}*$ value based thereon. Transfer block 62 modifies $I_{REF}$ based on the output of output of flux value unit 66 to obtain $I_{qs}$. Transfer function 62 is communicatively coupled to transform block 58, and supplies torque component current $I_{qs}*$ value as input to transform block 58. It is noted that during the operation of power generation system 20, the flux component current ($I_{ds}*$) value input to transform block 58 is set to zero. Hence, the operation of transform block 58 is based on positional data θ and torque component current $I_{qs}^*$.

Transfer function 64 is communicatively coupled to flux value output unit 66. Flux value output unit 66 passes field component current $I_{fld}$ value as input to transfer function 64, which converts field component current $I_{fld}$ value into a field reference voltage $V_{fld(ref)}$ value. Transfer function 64 is communicatively coupled to field converter 76, and passes the field reference voltage $V_{fld(ref)}$ value to field converter 76. Field converter 76 is configured to amplify and convert the field reference voltage $V_{fld(ref)}$ value into a field winding voltage, which is supplied from field converter 76 to field windings 30. Field converter 76 controls the excitation to the generator field winding, and hence controls the generator output voltage.

The operation of power generation system 20 includes steady state operation and dynamic operation. Dynamic operation includes variations in speed, e.g., of synchronous generator 26, and in load, e.g., dc bus 34 load. During the operation of power generation system 20, it is desirable that synchronous generator 26 be operated at a desired efficiency, e.g., an optimal efficiency. In order to do so, embodiments of the present invention employ the torque component current for controlling the stator winding (armature) currents, and the flux component current to control the field current based on the flux data stored in flux value output unit 66. This may enable the optimization of the field control loop to operate the synchronous generator 26 at high, e.g., maximum efficiency. In one form, the flux component current $I_{ds}$ input of (d-q) to a-b-c reference frame transform block 58 is set to zero, and hence, armature (stator) winding 32 currents are determined primarily by the torque component (torque component current $I_{qs}^*$ value). In addition, in one form, the excitation of synchronous generator 26 is controlled by the field current reference (field component current $I_{fld}$ value) output by flux value output unit 66. In one form, the optimum reference value for field voltage for a given speed (operating frequency ω) and load current (e.g., dc bus 34 load current) is obtained from flux value output unit 66. In another aspect, embodiments of the present invention employ instantaneous current controllers for the armature based on the field oriented components as inputs, which may enable a faster response to electrical load changes, e.g., on dc bus 34, e.g., relative to conventional systems. In yet another aspect, embodiments of the present invention eliminate the need for closing the loop for the field control based on stator ac voltage.

Thus, in one form, a control strategy for regulating the dc voltage of the power converter fed from a three phase synchronous generator in accordance with an embodiment of the present invention includes the following: The desired dc voltage $V_{REF}$ is compared with the actual dc voltage $V_B$ and the error is integrated and amplified to obtain the current reference $I_{REF}$. In one form, based on the speed (operating frequency ω) and load current, flux levels, e.g., optimum flux levels that correspond to high efficiency operation of synchronous generator 26, are pre-calculated and stored in LUT 66A. These stored values are used for deriving the torque and flux reference currents for the control of synchronous generator 26.

In one form, the torque component current is used for controlling the stator winding (armature) currents, and the flux component current is used to control the excitation current based on the flux profile stored in the LUT 66A. In one form, the flux component current $I_{ds}^*$ for the d-q/abc transformation is set to zero, so that the armature currents are determined mainly by the $I_{qs}^*$ component. In one form, the speed (operating frequency ω) of the synchronous generator 26 is integrated in integrator block 70 to obtain the angle θ required for the transformation. In one form, the excitation of the synchronous generator 26 is controlled by the field current reference value obtained from the flux profile look-up table LUT 66A. In one form, the optimum reference value for field voltage for a given speed (operating frequency ω) and load current is obtained from the LUT 66A. In some embodiments, the need for closing the loop for the field control based on stator ac voltage is eliminated. Since the final required voltage is dc (e.g., 270V dc or any suitable value), there is no need to regulate the stator output voltage. In one form, power converter 40 is used for regulating the dc voltage. In one form, the abc current references are compared with the measured currents of the armature and processed through the PI controllers 46, 48 and 50. The signals are used to derive the pulse width modulation signals to control the switching times of the power devices in power converter 40. In one form, the current loops also control the instantaneous currents of synchronous generator 26.

During the operation of power generation system 20, error block 72 compares the desired dc bus 34 voltage ($V_{REF}$) and the actual dc bus 34 voltage ($V_B$) to generate a difference error. In one form, the actual dc bus 34 voltage is an instantaneous value obtained during the operation of synchronous generator 26. In various embodiments, the determination may be made continuously, at one or more frequency intervals, or according to some other sampling scheme. The difference error resulting from the comparison is passed to controller block 74, which integrates and amplifies the signal, forming the reference current $I_{REF}$ value. The rotational speed (operating frequency ω) of synchronous generator 26 is obtained via speed sensor 68. In various embodiments, the rotational speed may be obtained continuously, or, for example, sampled, e.g., at one or more frequency intervals, or according to some other sampling scheme.

A flux component current and a torque component current are then determined based on the comparison, the operating frequency ω, and a predetermined value. In one form, the predetermined value is a reference flux value determined based on the comparison and the operating frequency ω of synchronous generator 26. In a particular form, the flux value is obtained from flux value output unit 66 via LUT 66A during the operation of synchronous generator 26, e.g., for each change in speed and load conditions, based on reference current $I_{REF}$ value and operating frequency ω. Each predetermined flux level value corresponds to a potential result of the comparison and a potential operating frequency ω of synchronous generator 26. In one form, the operating frequency ω is an instantaneous value obtained during operation of synchronous generator 26. In other embodiments, other values may be employed, e.g., time-averaged frequency values.

In one form, the excitation current of field winding 30 of the synchronous generator 26 is controlled using the flux component current to achieve the desired DC voltage. In one form, the flux component current is a field winding flux component current (e.g., field component current $I_{fld}$ value). Field component current $I_{fld}$ value is passed to transfer function 64, which converts field component current $I_{fld}$ value into a field reference voltage $V_{fld(ref)}$ value. The field reference voltage $V_{fld(ref)}$ value is passed to field converter 76, which converts the field reference voltage $V_{fld(ref)}$ value into a field winding voltage, which is then supplied from field converter 76 to field windings 30 to control field windings 30.

In one form, armature (stator) winding 32 current of synchronous generator 26 is controlled based on the stator winding torque component current. In one form, the torque component is obtained by passing the output of flux value output unit 66, field component current $I_{fld}$ value, along with $I_{REF}$, to transfer function 62, which outputs torque component current $I_{qs}*$ value based on field component current $I_{fld}$ value and $I_{REF}$. Torque component current $I_{ds}*$ value is provided from transfer function 62 as an input to transform block 58. In addition, the angular position θ value is determined by integrating operating frequency ω at integrator block 70, which supplies the angular position θ value as an input to transform block 58. As mentioned above, in one form, the flux component current $I_{ds}*$ input of (d-q) to a-b-c reference frame transform block 58 is set to zero.

Transform block 58 determines stator winding reference current $i_a*$, $i_b*$ and $i_c*$ values based on the torque component current $I_{ds}*$ value, the angular position θ value, and the flux component current $I_{ds}$ input being set to zero. Phase current sensors 80 and 78 sense the current in phase legs 32A and 32B of synchronous generator 26, respectively, and generate current values indicative of phase leg 32A current and phase leg 32B current, respectively, which are supplied to summer block 60. Summer block 60 calculates a current value indicative of phase leg 32C current. The current values representing the current in phase legs 32A, 32B and 32C are supplied to error blocks 52, 54 and 56, respectively, which determine the differences (errors) between the stator winding reference current $i_a*$, $i_b*$ and $i_c*$ and corresponding measured phase leg 32A, 32B and 32C current values. The errors are supplied to controller blocks 46, 48 and 50, which process and amplify the errors for input to PWM signal driver 44. PWM signal driver 44 generates PWM signals from the errors, and supplies the PWM signals to gate driver 42. Gate driver 42 controls the switching devices of power converter 40 to yield the desired voltage and current output on dc bus 34.

Embodiments of the present invention include a method of controlling an output of a synchronous electrical machine, comprising: comparing a desired DC voltage to an actual DC voltage; determining an operating frequency of the synchronous electrical machine; determining a flux component current and a torque component current based on: the comparison; the operating frequency; and a predetermined value; controlling a stator winding current in a stator winding of the electrical machine based on the torque component current; and controlling an excitation current of a field winding of the electrical machine using the flux component current to achieve the desired DC voltage.

In a refinement, the flux component current is a field winding flux component current; and wherein torque component current is a stator winding torque component current.

In another refinement, the predetermined value is a flux value determined based on the comparison and the operating frequency.

In yet another refinement, the flux value is obtained from a lookup table during operation of the electrical machine.

In still another refinement, the predetermined value is obtained from a lookup table during operation of the electrical machine.

In yet still another refinement, the lookup table includes a plurality of predetermined values; and wherein each predetermined value corresponds to a potential result of the comparison and a potential operating frequency.

In a further refinement, the operating frequency is an instantaneous operating frequency value obtained during operation of the electrical machine; and wherein the actual DC voltage is an instantaneous actual voltage value obtained during operation of the electrical machine.

In a yet further refinement, the method further comprises determining an angular position of the synchronous electrical machine; and determining a reference stator winding current value based on the torque component current and the angular position.

In a still further refinement, the method further comprises comparing the reference stator winding current value with a measured stator winding current value from a stator winding of the synchronous electrical machine to determine a stator winding current error.

In a yet still further refinement, the method further comprises generating a pulse width modulation signal based on the stator winding current error.

Embodiments of the present invention include a method of controlling an output of a synchronous electrical machine for powering a load, comprising: providing an electronic element configured to output a flux value based on a first input value and a second input value, wherein the first input value is based on a difference value between a desired output value and a corresponding actual output value; wherein the second input value is an operating frequency of the synchronous electrical machine; and wherein the flux value varies with changes in the difference value and the operating frequency; operating the synchronous electrical machine; determining the first input value while operating the synchronous electrical machine; detecting the second input value while operating the synchronous electrical machine; inputting the first input value and the second input value into the electronic element; outputting the flux value based on the first input value and the second input value; determining a flux component current and a torque component current based on: flux value; controlling a stator winding current in a stator winding of the electrical machine based on the torque component current; and controlling an excitation current of a field winding of the electrical machine using the flux component current to achieve the desired output value.

In a refinement, the method further comprises storing a relationship between a plurality of flux values and a plurality of combinations of first input values and second input values in the electronic element, wherein the flux value is determined based on the relationship, the first input value and the second input value.

In another refinement, the electronic element includes a lookup table stored therein and configured to output the flux value based on the first input value and the second input value.

In yet another refinement, the method further comprises determining an angular position of the synchronous electrical machine based on the operating frequency of the synchronous electrical machine.

In still another refinement, the method further comprises determining a reference stator winding current value based on the torque component current and the angular position.

In yet still another refinement, the method further comprises comparing the reference stator winding current value with a measured stator winding current value from a stator winding of the synchronous electrical machine to determine a stator winding current error value; and generating a pulse width modulation signal based on the stator winding current error value.

In a further refinement, the operating frequency is a rotational speed of the synchronous electrical machine.

In a yet further refinement, the first input value is a load reference current value.

In a still further refinement, the output of the synchronous electrical machine is performed without using field winding current control for the synchronous electrical machine based on stator winding ac voltage of the synchronous electrical machine.

Embodiments of the present invention include an aircraft power generation system, comprising: an engine; a synchronous generator coupled to and powered by the engine, wherein the synchronous generator has a field winding and a stator winding; a first electronic element configured to output a flux value based on a first input value and a second input value, wherein the first input value is based on a difference value between a desired output value of the power generation system and a corresponding actual output value; wherein the second input value is an operating frequency of the synchronous generator; and wherein the flux value output by the first electronic element varies with changes in the difference value and the operating frequency during the operation of the synchronous generator; a second electronic element configured to output the first input value; a third electronic element coupled to the first electronic element and the second electronic element, and configured as a transfer function operable to convert the flux value and the first input value into a torque component current value configured for controlling a stator winding current in the stator winding; and a fourth electronic element coupled to the first electronic element and configured to convert the flux value into a field winding reference value configured for controlling an excitation current in the field winding.

In a refinement, the aircraft power generation system further comprises: an integrator coupled to the synchronous generator and configured to integrate the operating frequency to provide an angular position of the synchronous generator; and means for controlling a stator winding current in the stator winding based on the angular position and the torque component current value.

In another refinement, the means for controlling is configured to generate a reference stator winding current value, and is configured to compare the reference stator winding current value with a measured stator winding current value to yield a stator winding current error value; and wherein the means for controlling is configured to control the stator winding current based on the stator winding current error value.

In yet another refinement, the means for controlling is configured to generate a pulse width modulation signal based on the stator winding current error value.

In still another refinement, the aircraft power generation system further comprises a DC bus powered by the synchronous generator, wherein the desired output value is a reference voltage, and wherein the actual output value is a DC bus voltage.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method of controlling an output of a synchronous electrical machine, comprising:
   comparing a desired DC voltage to an actual DC voltage;
   determining an operating frequency of the synchronous electrical machine;
   determining a flux component current and a torque component current based on: the comparison; the operating frequency; and a predetermined value;
   controlling a stator winding current in a stator winding of the electrical machine based on the torque component current; and
   controlling an excitation current of a field winding of the electrical machine using the flux component current to achieve the desired DC voltage.

2. The method of claim 1, wherein the flux component current is a field winding flux component current; and wherein torque component current is a stator winding torque component current.

3. The method of claim 1, wherein the predetermined value is a flux value determined based on the comparison and the operating frequency.

4. The method of claim 3, wherein the flux value is obtained from a lookup table during operation of the electrical machine.

5. The method of claim 1, wherein the predetermined value is obtained from a lookup table during operation of the electrical machine.

6. The method of claim 5, wherein the lookup table includes a plurality of predetermined values; and wherein each predetermined value corresponds to a potential result of the comparison and a potential operating frequency.

7. The method of claim 1, wherein the operating frequency is an instantaneous operating frequency value obtained during operation of the electrical machine; and wherein the actual DC voltage is an instantaneous actual voltage value obtained during operation of the electrical machine.

8. The method of claim 1, further comprising: determining an angular position of the synchronous electrical machine; and determining a reference stator winding current value based on the torque component current and the angular position.

9. The method of claim 8, further comprising comparing the reference stator winding current value with a measured stator winding current value from a stator winding of the synchronous electrical machine to determine a stator winding current error.

10. The method of claim 9, further comprising generating a pulse width modulation signal based on the stator winding current error.

11. A method of controlling an output of a synchronous electrical machine for powering a load, comprising:
    providing an electronic element configured to output a flux value based on a first input value and a second input value, wherein the first input value is based on a difference value between a desired output value and a corresponding actual output value; wherein the second input value is an operating frequency of the synchronous electrical machine; and wherein the flux value varies with changes in the difference value and the operating frequency;
    operating the synchronous electrical machine;
    determining the first input value while operating the synchronous electrical machine;

detecting the second input value while operating the synchronous electrical machine;

inputting the first input value and the second input value into the electronic element;

outputting the flux value based on the first input value and the second input value;

determining a flux component current and a torque component current based on: flux value;

controlling a stator winding current in a stator winding of the electrical machine based on the torque component current; and controlling an excitation current of a field winding of the electrical machine using the flux component current to achieve the desired output value.

12. The method of claim 11, further comprising storing a relationship between a plurality of flux values and a plurality of combinations of first input values and second input values in the electronic element, wherein the flux value is determined based on the relationship, the first input value and the second input value.

13. The method of claim 11, wherein the electronic element includes a lookup table stored therein and configured to output the flux value based on the first input value and the second input value.

14. The method of claim 11, further comprising determining an angular position of the synchronous electrical machine based on the operating frequency of the synchronous electrical machine.

15. The method of claim 14, further comprising determining a reference stator winding current value based on the torque component current and the angular position.

16. The method of claim 15, further comprising: comparing the reference stator winding current value with a measured stator winding current value from a stator winding of the synchronous electrical machine to determine a stator winding current error value; and generating a pulse width modulation signal based on the stator winding current error value.

17. The method of claim 11, wherein the operating frequency is a rotational speed of the synchronous electrical machine.

18. The method of claim 11, wherein the first input value is a load reference current value.

19. The method of claim 11, wherein the output of the synchronous electrical machine is performed without using field winding current control for the synchronous electrical machine based on stator winding ac voltage of the synchronous electrical machine.

20. An aircraft power generation system, comprising:
an engine;
a synchronous generator coupled to and powered by the engine, wherein the synchronous generator has a field winding and a stator winding;
a first electronic element configured to output a flux value based on a first input value and a second input value, wherein the first input value is based on a difference value between a desired output value of the power generation system and a corresponding actual output value; wherein the second input value is an operating frequency of the synchronous generator; and wherein the flux value output by the first electronic element varies with changes in the difference value and the operating frequency during the operation of the synchronous generator;
a second electronic element configured to output the first input value;
a third electronic element coupled to the first electronic element and the second electronic element, and configured as a transfer function operable to convert the flux value and the first input value into a torque component current value configured for controlling a stator winding current in the stator winding; and
a fourth electronic element coupled to the first electronic element and configured to convert the flux value into a field winding reference value configured for controlling an excitation current in the field winding.

21. The aircraft power generation system of claim 20, further comprising:
an integrator coupled to the synchronous generator and configured to integrate the operating frequency to provide an angular position of the synchronous generator; and
means for controlling a stator winding current in the stator winding based on the angular position and the torque component current value.

22. The aircraft power generation system of claim 21, wherein the means for controlling is configured to generate a reference stator winding current value, and is configured to compare the reference stator winding current value with a measured stator winding current value to yield a stator winding current error value; and wherein the means for controlling is configured to control the stator winding current based on the stator winding current error value.

23. The aircraft power generation system of claim 22, wherein the means for controlling is configured to generate a pulse width modulation signal based on the stator winding current error value.

24. The aircraft power generation system of claim 20, further comprising a DC bus powered by the synchronous generator, wherein the desired output value is a reference voltage, and wherein the actual output value is a DC bus voltage.

* * * * *